US012792067B2

(12) United States Patent
Goto

(10) Patent No.: US 12,792,067 B2
(45) Date of Patent: Nov. 10, 2026

(54) METHOD AND SYSTEM FOR DETERMINING AN INITIAL VALUE OF AT LEAST ONE PARAMETER AND METHOD AND SYSTEM FOR ADJUSTING A MASS FLOW CONTROLLER

(71) Applicant: Kuwana Metals, Ltd., Kuwana (JP)

(72) Inventor: Takao Goto, Mie-Ken (JP)

(73) Assignee: Kuwana Metals, Ltd., Kuwana (JP)

( * ) Notice: Subject to any disclaimer, the term of this patent is extended or adjusted under 35 U.S.C. 154(b) by 588 days.

(21) Appl. No.: 18/547,758

(22) PCT Filed: Feb. 14, 2022

(86) PCT No.: PCT/JP2022/005733
§ 371 (c)(1),
(2) Date: Aug. 24, 2023

(87) PCT Pub. No.: WO2022/201963
PCT Pub. Date: Sep. 29, 2022

(65) Prior Publication Data

US 2024/0126309 A1 Apr. 18, 2024

(30) Foreign Application Priority Data

Mar. 24, 2021 (JP) ................................ 2021-050631

(51) Int. Cl.
*G05D 7/06* (2006.01)
*G01F 1/69* (2006.01)
*G01F 5/00* (2006.01)

(52) U.S. Cl.
CPC ............. *G05D 7/0623* (2013.01); *G01F 1/69* (2013.01); *G01F 5/00* (2013.01)

(58) Field of Classification Search
CPC ........... G05D 7/0623; G01F 1/69; G01F 5/00; G01F 1/6965; G01F 25/13; G01F 25/15;
(Continued)

(56) References Cited

U.S. PATENT DOCUMENTS

2003/0236643 A1* 12/2003 Shajii ...................... G01F 1/684
702/100
2007/0215206 A1* 9/2007 Lull ........................ G01F 25/10
700/240
(Continued)

FOREIGN PATENT DOCUMENTS

CN 101713397 A 5/2010
CN 104685719 A 6/2015
(Continued)

OTHER PUBLICATIONS

PCT, "International Search Report and Written Opinion Regarding PCT/JP2022", Apr. 26, 2022, p. 6, Published in: JP.

*Primary Examiner* — Christopher W Carter
(74) *Attorney, Agent, or Firm* — NOD Law PC

(57) ABSTRACT

As for a plurality of mass flow controllers, a parameter of a certain mass flow controller is adjusted under a certain control condition, and the adjusted parameter is related with the control condition and is stored in a server. Next, the data having the control condition common with each other is extracted from the data stored in the server, an initial value of the parameter is determined based on the extracted data, and the initial value of the parameter, which is thus determined, is related with the common control condition and is stored in the server. The mass flow controller is adjusted by using the initial value of the parameter determined in this way. Thereby, an adjustment of the mass flow controller can be completed in fewer procedures, and occurrence of fault in the adjustment of the mass flow controller can be prevented.

13 Claims, 4 Drawing Sheets

(58) Field of Classification Search
CPC ........... G01F 1/68; G05B 11/36; G05B 11/42; G05B 23/027
See application file for complete search history.

(56) References Cited

U.S. PATENT DOCUMENTS

| | | | | |
|---|---|---|---|---|
| 2010/0000608 | A1* | 1/2010 | Goto | G01F 25/15 137/455 |
| 2011/0307104 | A1 | 12/2011 | Smirnov | |
| 2017/0168509 | A1* | 6/2017 | Ito | G05D 7/0635 |
| 2018/0286721 | A1* | 10/2018 | Ono | G01F 1/86 |

FOREIGN PATENT DOCUMENTS

| | | | |
|---|---|---|---|
| JP | H7263350 | A | 10/1995 |
| JP | 2005531069 | A | 10/2005 |
| JP | 4957725 | B2 | 6/2012 |
| JP | 2014059609 | A | 4/2014 |
| JP | 2016025503 | A | 2/2016 |
| JP | 2008039513 | A | 2/2021 |
| WO | 2021039665 | A1 | 3/2021 |

* cited by examiner

METHOD AND SYSTEM FOR DETERMINING AN INITIAL VALUE OF AT LEAST ONE PARAMETER AND METHOD AND SYSTEM FOR ADJUSTING A MASS FLOW CONTROLLER

TECHNICAL FIELD

This invention relates to a method and system for adjusting a mass flow controller.

BACKGROUND

A mass flow controller is a precision instrument used for the purpose of supplying process gas quantitatively to a manufacturing apparatus in a manufacturing process of a semiconductor, for example. A mass flow controller is manufactured by preparing parts adapted to the maximum flow rate of a fluid which the mass flow controller controls and combining those parts mutually. The thus assembled mass flow controller is adjusted individually before being shipped from a factory. An adjustment of a flow sensor, Japanese Patent Application Laid-Open (kokai) No. H07-263350 and an adjustment of a transient response, Japanese Patent Application Laid-Open (kokai) No. 2014-59609, etc. are included in an adjustment of a mass flow controller.

An adjustment of a mass flow controller is performed by using an input device of a personal computer connected with the mass flow controller to rewrite one kind of a parameter or a plurality of kinds of parameters for flow control stored in a nonvolatile memory of a microprocessor built in the mass flow controller, under a certain control condition. The parameters continue to be rewritten until accuracy of control action reaches a target value, while repeating an operation to actually pass a fluid through the mass flow controller and inspect the control action and an operation to rewrite the parameters based on the inspected control action alternatingly.

By the way, since a mass flow controller adjusted individually for each kind of gases and each of bin sizes has been used conventionally, it has been an issue that stock for various backup is needed. Therefore, in these days, a technology called an "MGMR (Multi-Gas-Multi-Range) function" which can be applied to a plurality of kinds of gases and a plurality of bin sizes by one set of a mass flow controller is utilized to contribute to drastic reduction of quantity of the stock, Japanese Patent No. 4957725. In an adjustment of a mass flow controller having this MGMR function, it is necessary to perform the adjustment for a plurality of kinds of gases and a plurality of bin sizes and to store adjusted parameters in memory of the mass flow controller.

Furthermore, in a gas supply unit, supply pressure of a gas to a mass flow controller may change. For example, in a gas panel for supplying the same kind of gas to a plurality of lines, etc., for the purpose of supplying the gas to a plurality of mass flow controllers, a supply passage of the gas to the mass flow controllers is branched for a plurality of lines. For this reason, supply pressure of the gas to the mass flow controllers (gas supply inlet pressure) may change instantly due to a cross talk phenomenon between the mass flow controllers, etc. Therefore, in a conventional gas supply unit, even when gas supply inlet pressure is changed, an actual flow rate of a gas controlled by a mass flow controller is stabilized by installing a regulator on an upstream side of mass flow controllers in a gas piping system to make the regulator absorb the change.

However, from a viewpoint of cost reduction and miniaturization of a gas piping system, the regulator is demanded to be omitted. Therefore, in the art, mass flow controllers having what is called a "PI (Pressure Insensitive) function" are spreading widely. The PI function is a function to correct a difference between a measured value of a flow rate (measured flow rate) and an actual flow rate due to a parasitic flow generated in a mass flow controller by change of gas supply inlet pressure. Specifically, a flow rate corrected to be closer to the actual flow rate (corrected flow rate) is obtained by calculating a flow rate of a parasitic flow (parasitic flow rate) from a measured value of the gas supply inlet pressure, accelerating the measured flow rate such that a bandwidth of the measured flow rate becomes equivalent to a bandwidth of the parasitic flow, and subtracting the parasitic flow rate from the measured flow rate accelerated in this way, International Patent Publication No. WO2021/039665. Therefore, in an adjustment of a mass flow controller having this PI function, it is necessary to perform the adjustment in a plurality of kinds of gases and a plurality of bin sizes while changing gas supply inlet pressure and to store adjusted parameters in memory of the mass flow controller.

SUMMARY

In a first embodiment, a method according to the present invention is a method for determining an initial value of at least one parameter regarding flow control, which is primarily input into a mass flow controller when adjusting the mass flow controller, and includes a first process and a second process listed below.

The first process: data is accumulated in a server by performing a first step and a second step individually for a plurality of mass flow controllers. In the first step, the parameter of a mass flow controller is adjusted under a certain control condition. In the second step, the data in which the parameter adjusted in the first step and the control condition are related with each other is stored in the server.

The second process: a third step, a fourth step and a fifth step are performed. In the third step, the data having the control condition common with each other is extracted from the data stored in the server. In the fourth step, the initial value of the parameter corresponding to the control condition common with each other is determined based on the extracted data. In the fifth step, the initial value of the parameter, which is determined in the fourth step, is related with the common control condition and is stored in the server.

The initial value of the parameter determined by the method according to the present invention turns into an initial value in which a result of the adjustment of a mass flow controller in the past has been reflected.

In a second embodiment, the method according to the present invention is a method for adjusting a mass flow controller used under a certain control condition, which includes a third process including a sixth step to an eighth step listed below.

The sixth step: the initial value of the parameter related with the control condition is read out from the server among the initial values of the parameters determined by the method according to the present invention.

The seventh step: the initial value of the parameter read out in the sixth step is input into the mass flow controller.

The eighth step: the parameter of the mass flow controller is adjusted under the control condition.

In accordance with this method, an adjustment of a mass flow controller can be started from an initial value of a parameter in which a result of the adjustment of a mass flow controller in the past has been reflected.

DETAILED DESCRIPTION

Technical Problem

Figure 1:
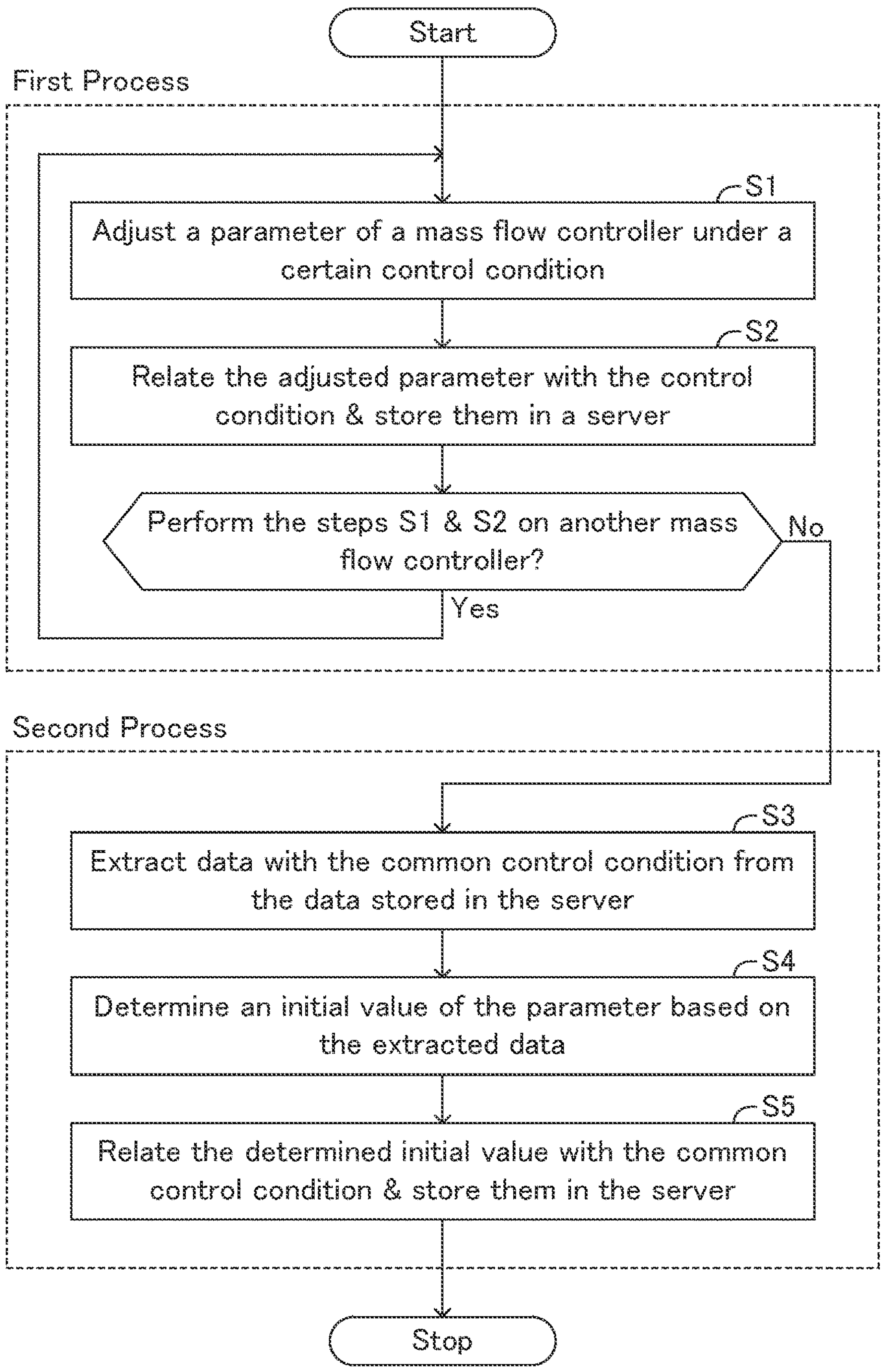
FIG. 1 is a flow chart for showing a first embodiment among methods according to the present invention.

In an adjustment of a mass flow controller in a conventional technology, the adjustment is started from a default value of a parameter stored in nonvolatile memory, is advanced while rewriting the parameter by trial and error, and is completed according to the above-mentioned procedure. Since much time will be taken before completing the adjustment when the set default value is not suitable, there is a possibility that personnel expenses of operators and the amount of consumption of a fluid used for the adjustment may increase. In an adjustment of a mass flow controller having the MGMR function, since it is necessary to store many parameters adjusted for a plurality of kinds of gases and a plurality of bin sizes in memory as mentioned above, especially much time, personnel expenses and fluid are required. Furthermore, in an adjustment of a mass flow controller having the PI function for which it is necessary to perform the adjustment for a plurality of kinds of gases and a plurality of bin sizes while changing gas supply inlet pressure as mentioned above, it is even more so.

Moreover, when the adjustment is performed by a conventional method, even if any of parts which constitutes the mass flow controller has a fault and/or even if the parts are not combined correctly, an operation of the adjustment itself is completed by rewriting the parameter repeatedly. In that case, as compared with a mass flow controller adjusted correctly, there is a possibility that an individual difference may arise in performance and/or a fault may occur when it is used.

The present invention has been conceived in view of the above-mentioned problems, and one objective of the present invention is to complete an adjustment of a mass flow controller with fewer procedures and to reduce variation in performance (individual difference) of mass flow controllers.

In accordance with a method according to the present invention, since procedures required for an adjustment of a mass flow controller can be reduced as compared with a conventional method, personnel expenses and the amount of consumption of a fluid used for the adjustment can be reduced and manufacturing cost of a mass flow controller can be also reduced. In a mass flow controller having the MGMR function and therefore requires much time, personnel expenses and fluid, merit brought by the above-mentioned effect attained by the method according to the present invention is large. Furthermore, in an adjustment of a mass flow controller having the PI function for which it is necessary to perform the adjustment for a plurality of kinds of gases and a plurality of bin sizes while changing gas supply inlet pressure as mentioned above, it is even more so.

Embodiments of the present invention will be described in detail below, referring to drawings. The following description is not more than exemplification of specific embodiments of the present invention, and the present invention is not limited to the embodiments described below.

Configuration of Mass Flow Controller

Figure 4:
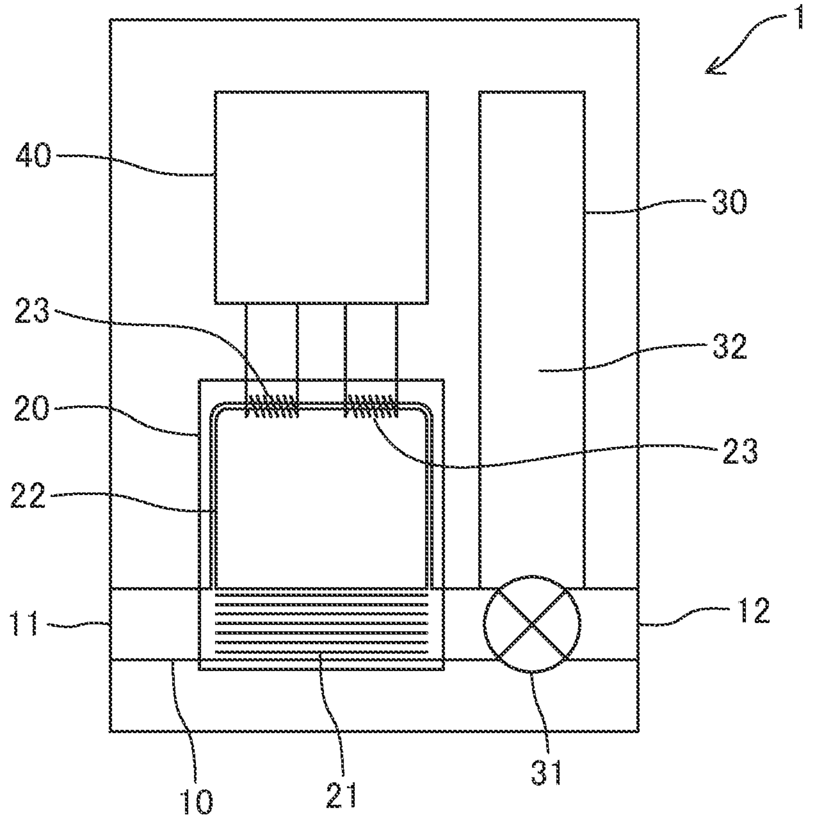
FIG. 4 is a schematic view for showing an example of a configuration of a mass flow controller.

FIG. 4 is a schematic view for showing an example of a configuration of a mass flow controller. It is important to note that FIG. 4 is for showing a configuration of a mass flow controller conceptionally, and is not for showing the mass flow controller or shapes, structures and combination of parts which constitute the mass flow controller specifically.

A mass flow controller 1 shown in FIG. 4 comprises a channel 10 through which a fluid flows. The fluid flows into the inside of the mass flow controller 1 from an inlet 11, and flows out of an outlet 12 to the outside. Between the inlet 11 and the outlet 12 of the channel 10, a flow sensor 20 and a flow control valve 30 are prepared. The flow sensor 20 comprises a bypass 21 prepared inside the channel 10, a sensor tube 22 branching from the channel 10, and a set of electrically heated wires 23 wound around an upstream side part and a downstream side part of the sensor tube 22. The bypass 21 has a function to keep constant a ratio of a flow rate of the fluid which flows through the channel 10 and a flow rate of the fluid which branches into the sensor tube 22. The bypass 21 can be constituted by a laminar flow element in which many pipes are bundled, for example. The sensor tube 22 branches from the channel 10 at an upstream side of the bypass 21, and joins the channel 10 again at a downstream side of the bypass 21. In a state where the set of the electrically heated wires 23 wound around the sensor tube 22 is electrified, since heat produced by the electrification moves to a downstream side from an upstream side when the fluid is flowing inside of the sensor tube 22, a difference in a resistance value between the set of the electrically heated wires 23 arises due to the difference in temperature between them. By detecting this difference in a resistance value, a flow rate of the fluid which flows inside the sensor tube 22 can be detected, and also a flow rate of the fluid which flows through the channel 10 can be detected. Namely, the flow sensor 20 shown in FIG. 4 is a thermal flow sensor.

The flow rate of the fluid detected by the flow sensor 20 is used for controlling a flow rate of the fluid which flows through the channel 10. Specifically, an opening of the flow control valve 30 is controlled by a control part 40 which the mass flow controller 1 comprises such that the flow rate of the fluid detected by the flow sensor 20 coincides with a set flow rate given previously. The flow control valve 30 comprises a valve body 31 and its driving mechanism 32. A control signal output from the control part 40 is input into the driving mechanism 32, and the opening of the valve body 31 is controlled. When the driving mechanism 32 is constituted by a piezo-electric element, a voltage signal can be used as the control signal. Although the mass flow controller 1 shown in FIG. 4 comprises the thermal flow sensor 20, the mass flow controller 1 may comprise a so-called pressure type flow sensor or another well-known flow sensor as the flow sensor 20. Irrespective of a configuration of the flow sensor 20, the mass flow controller 1 measures the flow rate of the fluid with the flow sensor 20, and performs automatic control such that the flow rate coincides with the set flow rate.

Rated Flow Rate

In the present specification, the maximum of a flow rate of a fluid which can be controlled by a mass flow controller is referred to as a "rated flow rate" or "full scale flow" hereafter. The rated flow rate required for a mass flow controller by a user ranges over an extremely wide range, such as from 10 standard cube centimeter per minute (which will be referred to as an "sccm" hereafter) to 50,000 sccm, for example, in terms of a nitrogen gas at a standard condition. In the mass flow controller 1 exemplified in FIG. 4, the rated flow rate largely depends on a cross-sectional area and shape of the channel 10, the bypass 21 and the valve body 31 with which the fluid contacts directly. The larger the cross-sectional area of a portion through which the fluid flows in these parts becomes, the larger the maximum of the flow rate of the fluid which can be controlled by the mass flow controller 1 becomes. When a low flow rate is controlled using a mass flow controller designed for a high rated flow rate, accuracy of flow control becomes low. On the contrary, it is physically impossible to supply the fluid at a high flow rate using a mass flow controller constituted by parts which have a small cross-sectional area such that a low rated flow rate can be controlled. Therefore, it is necessary to design individually parts through which a fluid flows, such as the channel 10, the bypass 21 and the valve body 31, so as to suit a magnitude of a rated flow rate.

In actual products of mass flow controllers, a manufacturer divides a range of a rated flow rate into some divisions, and manufactures the products adapted for respective divisions. Such a division of a rated flow rate will be referred to as a "bin size" hereafter. Moreover, a number attached for convenience for specifying a bin size will be referred to as a "bin number" hereafter. Examples of bin numbers and bin sizes are shown in Table 1. In the examples shown in Table 1, a user who demands a mass flow controller with a rated flow rate of 2,000 sccm may purchase a mass flow controller with a bin number of BIN 5 (namely, a division of a rated flow rate is 1,001 to 3,000 sccm) from a manufacturer to use the mass flow controller. In the divisions of the rated flow rate shown in Table 1, as for parts, such as the channel 10, the bypass 21 and the valve body 31, through which a fluid flows, a different part may be designed for every bin size individually, and a common part may be used for a plurality of bin sizes with rated flow rates close to each other.

TABLE 1

| | | Parameters for Flow Sensor | | | Parameters for Transient Response | | |
|---|---|---|---|---|---|---|---|
| Bin Number | Bin Size (sccm) | Zero Point | Span | Linearity | Proportional Gain | Integral Gain | Derivative Gain |
| BIN 1 | 10 to 30 | | | | | | |
| BIN 2 | 31 to 100 | $Z_2$ | $S_2$ | $L_2$ | $P_2$ | $I_2$ | $D_2$ |
| BIN 3 | 101 to 300 | $Z_3$ | $S_3$ | $L_3$ | $P_3$ | $I_3$ | $D_3$ |
| BIN 4 | 301 to 1000 | $Z_4$ | $S_4$ | $L_4$ | $P_4$ | $I_4$ | $D_4$ |
| BIN 5 | 1001 to 3000 | $Z_5$ | $S_5$ | $L_5$ | $P_5$ | $I_5$ | $D_5$ |
| BIN 6 | 3001 to 5000 | $Z_6$ | $S_6$ | $L_6$ | $P_6$ | $I_6$ | $D_6$ |
| BIN 7 | 5001 to 10000 | $Z_7$ | $S_7$ | $L_7$ | $P_7$ | $I_7$ | $D_7$ |
| BIN 8 | 10001 to 30000 | $Z_8$ | $S_8$ | $L_8$ | $P_8$ | $I_8$ | $D_8$ |
| BIN 9 | 30001 to 50000 | | | | | | |

Parameters

In the present specification, a "parameter" means a variable input for the purpose of determining the contents of control when a mass flow controller performs flow control algorithm. One kind of a parameter may be used in a mass flow controller, or two or more kinds of parameters may be used. Specific examples of the parameter in the present invention will be mentioned later. In the present specification, "to adjust a mass flow controller" means to actually flow a fluid through a mass flow controller after an assembly and to inspect whether the mass flow controller satisfies a performance as a target value, and to change a parameter until it attains the target value when the performance is not satisfied as a result of an inspection. As mentioned previously, the adjustment of a mass flow controller is performed by rewriting at least one parameter in fact. Namely, the adjustment continues to be repeatedly performed until accuracy of control action reaches a target value, while repeating an operation to actually pass a fluid to the mass flow controller and inspect the control action and an operation to rewrite the parameter based on the inspected control action alternatingly. The adjustment of a mass flow controller may be performed manually by an operator, or may be performed automatically according to an operation by a computer program, as will be explained later in detail. The adjustment of a mass flow controller is individually performed for every set of the mass flow controller after manufacture and before shipment, and a parameter is not changed in principle once the parameter is adjusted.

First Embodiment

In a first embodiment, the present invention is an invention of a method for determining an initial value of at least one parameter which is primarily input into a mass flow controller when adjusting the parameter of the mass flow controller. In the present specification, the "initial value" means an initial value of a parameter to be primarily input into a mass flow controller when starting the adjustment of the mass flow controller. In a conventional technology, a default value has been used as a parameter which is primarily input into a mass flow controller. In the present specification, the "default value" means a set value which is previously prepared for the purpose of preventing in advance malfunction (fault) of a system which arises when no value is input in a program processing which requires an input of any value. The default value which has been used in the conventional technology is a fixed value, and a result of the adjustment of a parameter has not been reflected. On the other hand, the initial value of a parameter in accordance with the method of the present invention is determined according to a predetermined procedure based on a value of the parameter determined as a result of the adjustment performed individually in the past.

FIG. 1 is a flow chart for showing a method according to a first embodiment of the present invention. This method includes two processes. A first process is a process to accumulate data in a server by performing a first step (S1)

and a second step (S2) individually for a plurality of mass flow controllers. In the first step (S1), the parameter of a mass flow controller is adjusted under a certain control condition. In the second step (S2), the data in which the parameter adjusted in the first step (S1) and the control condition are related with each other is stored in the server. In the present specification, a "control condition" of a mass flow controller means conditions which affect control of a flow rate. Specific example of the control condition in the present invention will be mentioned later. When the parameter of a plurality of mass flow controllers is individually adjusted under an identical control condition, the values of the parameter determined by the adjustment are not largely different according to individuals of the mass flow controllers. However, due to an individual difference of parts which constitute the mass flow controllers, etc., the values of the parameter are not identical completely, but there is variation for every adjustment. In the first process, a step in which the adjusted parameter including variation is stored in the server as a data related with the control condition is performed individually for a plurality of mass flow controllers and the data is accumulated in the server.

In the present specification, the "server" means a computer system with a storage device, and preferably a computer system connected with a mass flow controller directly or through an operation terminal (for example, a personal computer, etc.) for the adjustment. The mass flow controller and the server can be in connection with each other through a well-known communication line, such as a LAN cable and/or the Internet. However, a communication line which connects the mass flow controller and the server is not necessarily required. For example, when an operator performs the adjustment manually, the data can be accumulated in the server by the operator inputting the adjusted parameter using an input device which the server itself comprises.

A second process included in the method according to the first embodiment is a process to perform a third step (S3), a fourth step (S4) and a fifth step (S5). In the third step (S3), the data having the control condition common with each other is extracted from the data stored in the server. In the fourth step (S4), the initial value of the parameter corresponding to the control condition common with each other is determined based on the extracted data. In the fifth step (S5), the initial value of the parameter, which is determined in the fourth step (S4), is related with the common control condition and is stored in the server. In the server, as a result of performing the first process, the data with different control conditions is stored as the data related with control conditions. When only the data with a common control condition is extracted from the data stored in the server, since all the control conditions of the extracted data are the same, there is little variation. Therefore, by determining the initial value of the parameter based on the extracted data, a highly reliable initial value of the parameter in which the result of the past adjustment has been reflected can be obtained. What is necessary is just to determine the initial value of the parameter based on the extracted data, namely using the extracted data, and specific method for the determination is not limited in particular. As a method for determining the initial value of the parameter based on the extracted data, a statistical method, such as calculation of an average value and selection of a median or a mode, can be employed, for example. By relating the initial value of the parameter, which is thus determined, with the common control condition and storing the same in the server, the initial value of the parameter corresponding to the control condition can be read out from the server at any time to be used as an initial value of the parameter for the next adjustment.

In a preferred embodiment of the method according to the present invention, the control condition includes a type of the mass flow controller, a kind of a fluid, and a bin size. As mentioned above, when the parameter of a plurality of mass flow controllers is individually adjusted under an identical control condition, the values of the parameters determined by the adjustment are not largely different according to individuals of the mass flow controllers. In other words, when the control condition of a mass flow controller is different, there is a tendency that an adjusted parameter becomes a different value from the parameter when the control condition is identical. Therefore, it is important what kind of a condition among control conditions of a mass flow controller the data is related with and to be accumulated in the server. One of the control conditions which have relatively large influence on the value of a parameter is a type of mass flow controller. As specific examples of types of mass flow controllers, a mass flow controller comprising a thermal flow sensor and a mass flow controller comprising a pressure type flow sensor, etc., can be exemplified. Among different types of mass flow controllers, even when parts other than flow sensors, such as a channel and a flow control valve, are common, values of a parameter are largely different due to a difference in a transient response of a flow sensor, etc., in many cases.

Moreover, a kind of the fluid which is a target of control also influences the value of a parameter largely. Since thermal properties and other dynamical properties, such as viscosity, of a fluid differs when the kind of the fluid differs, behavior of the fluid differs not only in a flow sensor, but also in a bypass or a flow control valve. For this reason, the values of the adjusted parameter also come to differ largely. Furthermore, even when the type of the mass flow controller and the kind of the fluid are the same, the values of the parameter may differ due to a difference in the Reynolds number of the fluid, etc., in a case where the bin sizes differ. Thus, the values of the parameter determined by an adjustment may differ largely according to various control conditions of mass flow controllers. Therefore, when the adjustment is performed using an initial value determined without taking a control condition into consideration, there is a possibility that it may take much time to adjust the parameter.

In the method according to the present invention, parameters with a common control condition are extracted from adjusted parameters related with control conditions and stored in a server, and an initial value of the parameter is determined based on the extracted data. The initial value determined in this way is a value in which a result of the adjustment of the parameter performed in the past under the control condition has been reflected, unlike the default value in the conventional technology. When a mass flow controller is adjusted using such an initial value, time until accuracy of a control operation reaches a target value from a start of the adjustment is shortened, and the adjustment can be performed quickly.

In a case of preferred embodiment of the present invention, since the control condition including the type of the mass flow controller, the kind of the fluid and the bin size, which is considered to have large influence on the parameter, are common, the effect for shortening time required for the adjustment becomes more remarkable. As for these elements which are considered to have large influence on the parameter, any one of them may be common, or two or three all of them may be common. The more there are common elements, the more remarkable the effects of the present invention become.

In the method according preferred embodiment of the present invention, the adjustment includes an adjustment of a flow sensor, and the parameter includes parameters regarding a zero point, a span and linearity. In the present specification, the "adjustment of a flow sensor" means to adjust a parameter which affects an output of a flow sensor such that a difference between a flow rate corresponding to an output signal regarding a flow rate of a fluid, which the flow sensor built in the mass flow controller outputs, and an actual flow rate becomes a target value or less. An operation for bringing a flow rate of a fluid which a flow sensor detects close to a true value by adjusting a flow sensor may be referred to as "calibration" of a mass flow controller or a flow sensor. When a flow sensor is not calibrated correctly, since an error is included in a flow rate of a fluid, on which a mass flow controller makes the ground of control, a flow rate cannot be controlled correctly. Therefore, an adjustment of a flow sensor is a fundamental and important operation.

Figure 2:
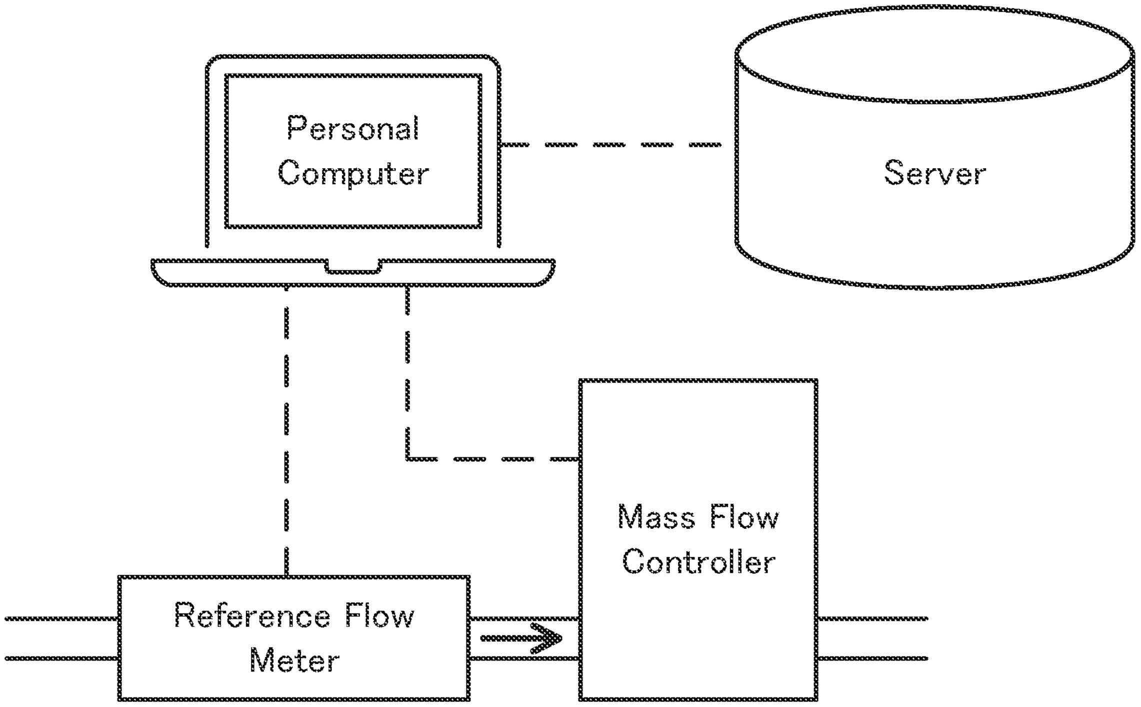
FIG. 2 is a schematic view for showing an example of an adjustment method of a flow sensor among the methods according to the present invention.

FIG. 2 is a schematic view for showing an example of an adjustment method of a flow sensor. A short arrow in the drawing indicates a direction in which a fluid flows in a channel. Moreover, dashed lines connecting a plurality of constitutional members represent passages for exchanging a signal and/or an instruction, etc., among the constitutional members. When adjusting a flow sensor, generally, the flow sensor is adjusted by connecting a reference flow meter which gives a reference of a measured value of a flow rate and a mass flow controller in series, as exemplified in FIG. 2, to pass a fluid and rewriting a parameter of a flow sensor with a personal computer such that the output of the flow sensor coincides with the output of the reference flow meter. As the reference flow meter, molbloc (molbloc is a U.S. registered trademark of Fluke Corporation.), etc., can be used, for example. The adjusted parameter is related with the control condition and stored in the server.

Although a zero point, a span and linearity, etc., can be mentioned as specific examples of the parameter which affects an output of a flow sensor, the parameter is not limited to these. An adjustment of the parameter regarding a zero point is performed such that the output of the flow sensor becomes zero when no fluid is flowing. An adjustment of the parameter regarding a span is performed such that both the output of the flow sensor and the output of the reference flow meter indicate a full scale flow when a fluid is flowing at the full scale flow after the adjustment of the parameter regarding a span. An adjustment of the parameter regarding linearity is performed by correcting the output of the flow sensor using software such that the output of the flow sensor is proportional to an actual flow rate between the zero point and the full scale flow, when a relation between the output of the flow sensor and the actual flow rate deviates from a proportionality relation and nonlinearity is observed. Since all of three kinds of these parameters affect the output of the flow sensor directly, they are parameters for which it is preferable to determining their initial values as mentioned above. However, in preferred embodiments of the present invention, it is not precluded to adjust other parameters which affect an output of a flow sensor directly or indirectly to determine their initial values, in addition to the parameters regarding a zero point, a span and linearity. In addition, the adjustment of a flow sensor is performed in a state where a flow rate of a fluid is stable at a fixed value. An adjustment of a parameter in case where an output of a flow sensor changes temporally is included in an adjustment of a transient response which will be mentioned below.

In the method according to a preferred embodiment of the present invention, the adjustment includes an adjustment of a transient response, and the parameter includes parameters regarding a proportional gain, an integral gain and a derivative gain. In the present specification, the "adjustment of a transient response" means to adjust a parameter which affects a transient response such that an index of a chronological change of a flow rate when a set flow rate given to a mass flow controller is changed (transient response) comes within a predetermined range. Although time until a flow rate reaches 98% of a set flow rate from a start of control, overshooting and hunching, etc., can be mentioned as specific examples of the index of a transient response, they are not limited to these. An operation for adjusting a transient response of a mass flow controller may be referred to as a "tuning" of a mass flow controller. When a mass flow controller is not tuned correctly, since an individual difference arises in a chronological change of a flow rate when a set flow rate is changed, there is a possibility that an error may arise in a total amount of supply of a fluid. Therefore, the adjustment of a transient response is a fundamental and important operation like the adjustment of a flow sensor. When adjusting a transient response, it is common to monitor an output of a flow sensor when changing a set flow rate 100% or 50%, etc., of a full scale flow (which may be referred to as a "step response" hereafter) and adjust a parameter of a mass flow controller such that an index of a transient response (for example, time until a flow rate reaches 98% of a set flow rate) comes within a predetermined range.

Although a proportional gain, an integral gain and a derivative gain, etc., can be mentioned as parameters regarding a PID operation that is typical feedback control can be mentioned as specific examples of the parameter which affects a transient response, they are not limited to these. Moreover, flow rate control algorithm in the present invention is not limited to the PID operation, but well-known automatic control, such as feed-forward control, H-infinity control, fuzzy control and neural network control can be adopted. In these automatic control methods, the term "parameter" in the present specification should be interpreted to have the largest meaning. In order to evaluate the step response correctly when adjusting a transient response, generally, it is preferable to complete the adjustment of a flow sensor in advance. However, since the adjustment of a transient response may have large influence on the adjustment of a flow sensor under some control conditions, it is preferable to judge which of the adjustment of a flow sensor and the adjustment of a transient response is performed primarily on a case-by-case basis. Moreover, it is preferable to repeatedly perform the adjustment of a flow sensor and the adjustment of a transient response a plurality of times in an alternate manner in order to adjust a mass flow controller more correctly.

Referring to Table 1 again, Table 1 is a table for showing examples of initial values of parameters determined as a result of the adjustment of mass flow controllers with an identical type of the mass flow controller and an identical kind of a fluid, but only bin sizes different from one another, in a preferred embodiment of the present invention. In Table 1, parameters of a zero point, a span and linearity are listed as parameters which affect an output of a flow sensor, and a proportional gain, an integral gain and a derivative gain are listed as parameters which affect a transient response, respectively. In Table 1, blank portions represent that no parameter has been adjusted under the corresponding control condition in the past and therefore any initial value of the parameter has not been determined yet.

Here, the adjustment of a parameter which affects a transient response will be explained in detail below. As exemplified in Table 1, as an initial value of a parameter, a different value can be determined for every bin size. However, as for parameters not largely affected by a difference in bin size, a sole initial value common for all bin sizes can be adopted. Furthermore, a full scale in a certain bin size (for example, 2,000 sccm) can be divided to some divisions (for example, 1%, 2%, 5%, 10%, 25%, 50%, 75%, 100%, 120%, 140% of the full scale), and a different initial value of a parameter can be determined for every division.

Among the parameters exemplified in Table 1, a fine setting as mentioned above is particularly effective for linearity and a proportional gain. This is because flow characteristics of a flow control valve (change of a flow rate with respective to an opening of a valve) is not simply proportional and contains a nonlinear element. For the same reason, these two parameters tend to be affected by a difference in bin size. On the other hand, since an integral gain and a derivative gain are parameters which is not easily affected by a difference in a division of a full scale and a bin size, a common initial value may be able to be used irrespective of divisions and/or bin sizes. As an initial value of a parameter, an average value of parameters adjusted using a plurality of sets (for example, 3 to 5 sets) of mass flow controllers can be employed, for example.

In addition, in the adjustment of a parameter, the adjustment of a parameter of a flow sensor is the most fundamental adjustment, and the adjustment of a parameter of a flow sensor is usually performed primarily. In this adjustment, the parameter of a flow sensor is adjusted such that a flow rate measured by a mass flow controller coincides with a flow rate indicated by a reference flow meter (for example, molbloc). In the adjustment of a parameter of a transient response, each gain of a PID is adjusted such that response time to a step input (an index of a transient response obtained from a step response) becomes the shortest, for example. Both the adjustments are a fine tuning required since a mass flow controller has an individual difference. It is thought that it will become possible to adjust a parameter based on a result of analysis by an A.I. (Artificial Intelligence) based on big data stored in a server in the future.

In the method according to a preferred embodiment of the present invention, the parameter which is primarily input into the mass flow controller when adjusting the parameter is not an optimal value for the control condition, but is a provisional and generic default value with which the mass flow controller can be operated under a broad control condition. This method is effective when adjusting a mass flow controller for the first time under a certain control condition. As mentioned above, when any adjustment has not been performed in the past under a certain control condition like the blank portions in Table 1, no initial value described in the present invention exists. Therefore, in such a case, the first process can be started by inputting a previously defined default value into a mass flow controller as a parameter. Although the default value input at this time is not a value optimal for the above-mentioned control condition, it is a provisional and generic default value with which the mass flow controller can be operated under a broad control condition. Here, "provisional" means that the value is a temporary value which is used only until the parameter is changed by the adjustment. Moreover, "generic" means that the value can be used commonly under a broad control condition, not only under a specific control condition. Such a default value can be set based on a parameter after the adjustment in a mass flow controller having a similar configuration which has been adjusted in the past and/or a parameter after the adjustment in a case where a bin size is close for an identical type of a mass flow controller and an identical kind of a fluid.

Second Embodiment

In a second embodiment, the present invention is an invention of a method for adjusting a mass flow controller used under a certain control condition. In this method, a parameter of the mass flow controller is adjusted using the initial value of the parameter determined by the method according to the first embodiment. As mentioned above, unlike a default value used in a conventional technology, the initial value determined by the method according to the first embodiment is a value in which a result of the adjustment of the parameter, which was performed in the past under a control condition under which the parameter is to be adjusted, has been reflected. For this reason, time until accuracy of a control operation reaches a target value from a start of the adjustment is shortened, and the adjustment can be performed quickly.

Figure 3:
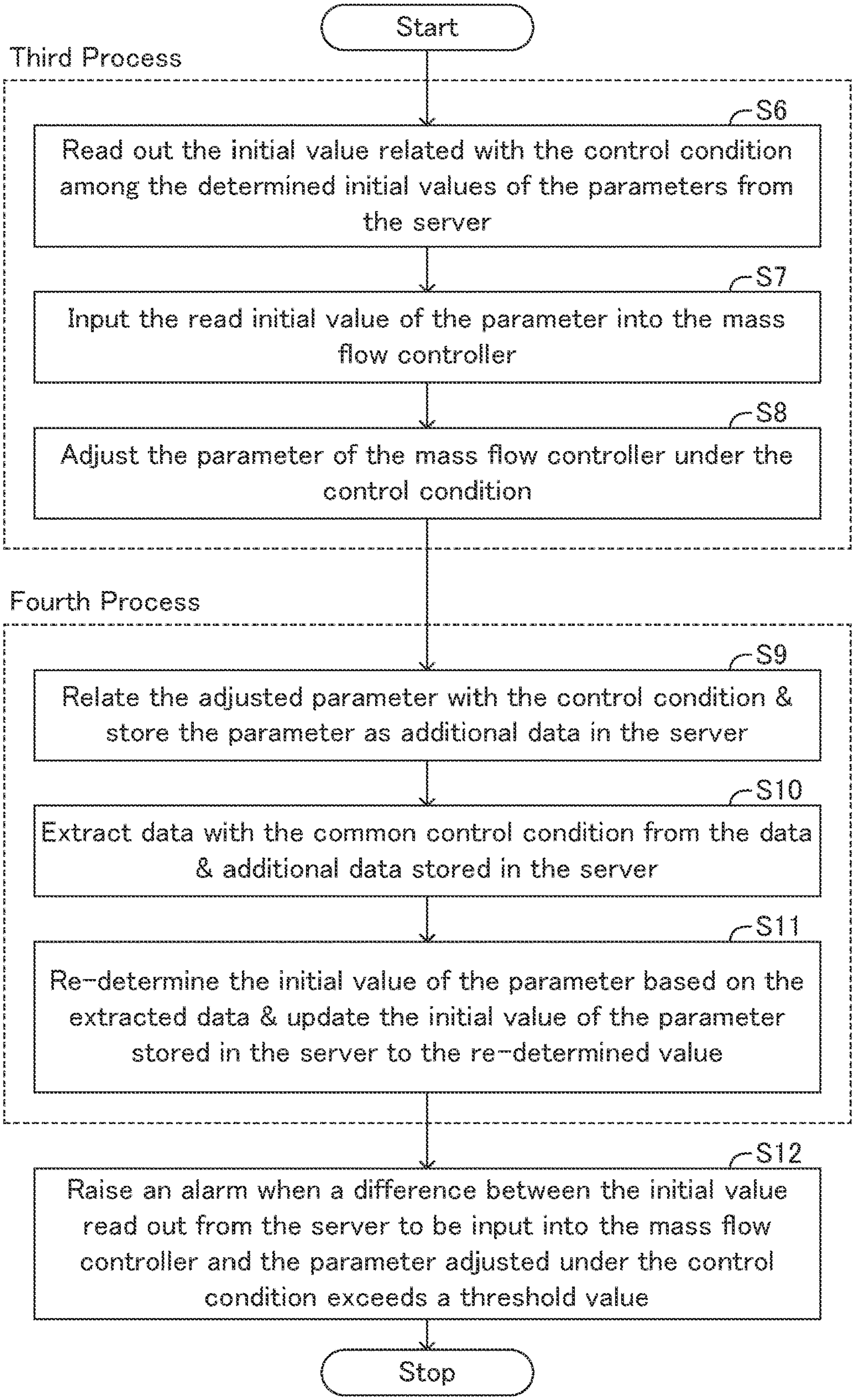
FIG. 3 is a flow chart for showing a second embodiment among the methods according to the present invention.

FIG. 3 is a flow chart for showing the method according to the second embodiment of the present invention. This method includes a third process. The third process is a process in which a sixth step (S6), a seventh step (S7) and an eighth step (S8) are performed. In the sixth step (S6), the initial value of the parameter related with the control condition is read out from the server among the initial values of the parameters determined by the method according to the first embodiment. In the seventh step (S7), the initial value of the parameter read out in the sixth step (S6) is input into the mass flow controller. In the eighth step (S8), the parameter of the mass flow controller is adjusted under the control condition.

In this method, the control condition of the mass flow controller whose parameter is to be adjusted and used is determined in advance. In the sixth step S6, among the initial values of the parameters stored in the server as a result of performing the second process in the method according to the first embodiment, the initial value of the parameter adjusted under a control condition identical to the control condition under which the parameter is to be adjusted is searched and read out from the server when there is such an initial value. The read initial value is input into the mass flow controller (the seventh step S7), and the parameter of the mass flow controller is anew adjusted under the control condition identical to that for the read initial value (the eighth step S8). When the demanded initial value is not accumulated in the server, the third process cannot be performed. In such a case, by performing the first process and the second process in the first embodiment under a required control condition before performing the third process, the initial value of the parameter under the control condition can be determined, and the third process can be performed thereafter.

In a preferred embodiment, the method according to the second embodiment includes a fourth process. The fourth process is a process to perform a ninth step (S9), a ten step (S10) and an eleventh step (S11). In the ninth step (S9), additional data in which the parameter of the mass flow controller adjusted in the eighth step (S8) is related with the control condition is stored in the server. In the tenth step (S10), the data and the additional data having the control condition common with each other are extracted from the data and the additional data stored in the server. In the eleventh step (S11), an initial value of the parameter is re-determined based on the data and the additional data extracted in the tenth step (S10) and the initial value stored in the server is updated to the initial value, which is thus re-determined.

The fourth process is performed not only for using the parameter adjusted in the third process to control the mass flow controller, but also for the purpose of utilizing the parameter as data for determining the initial value of the parameter which will be used in the subsequent adjustment like the adjusted parameter which was stored in the server at the second step S2 in the first process. Since new additional data is accumulated in the server whenever the mass flow controller is adjusted by performing the fourth process, a result of the newest adjustment has been reflected in the re-determined and updated initial value. Thereby, even in a case where a chronological change arises for a certain reason in the initial value to be determined, the initial value input into the mass flow controller can be adapted to the change. As the data and additional data extracted in the tenth step S10 for re-determining the initial value of the parameter in the eleventh step S11, all the data and additional data stored in the server may be extracted, or only a fixed number of the data and additional data may be chosen by tracing back to the past from the present to be extracted. The former method is preferable when the initial value of the parameter, which is determined as mentioned above, repeats increase and decrease with time, and the latter method is preferable when the initial value only increases or decreases with time.

In a preferred embodiment, the method according to the second embodiment is a method further including a twelfth step (S12) in which an alarm is raised when a difference between the initial value read out from the server and input into the mass flow controller and the parameter adjusted based on the control condition and the input initial value exceeds a predetermined threshold value. In other words, the twelfth step (S12) is a step in which an alarm is raised when a difference between the initial value input into the mass flow controller in the seventh step and the parameter adjusted in the eighth step exceeds a predetermined threshold value. The alarm raised in the twelfth step is not limited in particular, as long as it is possible to inform an operator of an occurrence of an abnormality. As specific examples of such an alarm, auditory alarms, such as a buzzer and a synthetic voice, and visual alarms, such as a warning light and a display indication, etc., can be mentioned, for example.

As mentioned above, when the parameter of a plurality of mass flow controllers are individually adjusted under an identical control condition, in general, the values of the parameter determined by the adjustment are not largely different according to individuals of the mass flow controllers. However, due to an individual difference of parts which constitute the mass flow controllers, etc., the values of the parameter are not identical completely, but there is variation for every adjustment. Although there is no problem when the variation remains within a fixed range, a possibility that some kind of problem may have occurred in a process of the adjustment is high when an extent of the variation is unprecedentedly large. As a cause for which the extent of the variation becomes large like this, an unsuitable combination of parts which constitute a mass flow controller and a fault of the parts, as mentioned above, as well as misalignment and a change with time of the parts, etc., can be mentioned, for example. However, in accordance with this method, when the difference between the initial value of the parameter input into the mass flow controller before the adjustment and the parameter after the adjustment exceeds a threshold value, it is possible inform an operator of an occurrence of an abnormality by raising an alarm to prevent a wrongly adjusted mass flow controller from being supplied to a user in advance.

Third Embodiment

As mentioned at the beginning of the present specification, the present invention relates not only to a method for determining an initial value of a parameter and a method for adjusting a mass flow controller, but also to a system for determining an initial value of a parameter and a system for adjusting a mass flow controller.

In a third embodiment, the present invention is a system used to determine an initial value of a parameter regarding flow control, which is primarily input into a mass flow controller when adjusting the mass flow controller. The system according to the present invention comprises at least one operation terminal which is connected to the mass flow controller and is configured so as to be able to adjust the parameter, at least one server, and a means of communication which enables transfer of data among the mass flow controller and the operation terminal and the server.

The operation terminal is not limited in particular as long as it is possible to be connected to the mass flow controller and adjust the parameter, and may be a computer system, such as a personal computer, for example, as mentioned above. The server is also a computer system which has a storage device, such as a hard disk drive (HDD) and a solid state drive (SSD), as mentioned above. The means of communication is not limited in particular as long as it enables transfer of data among the mass flow controller, the operation terminal and the server, and is constituted by a series of devices which deliver and receive data through well-known communication lines, such as a LAN cable and/or the Internet (for example, a communication circuit board, etc.), as mentioned above.

Furthermore, the system according to the present invention is configured so as to perform at least the second process included in the method according to the above-mentioned first embodiment of the present invention by a processing unit which the operation terminal and/or the server comprise executing a predetermined instruction according to a program stored in a storage device which the operation terminal and/or the server comprise. Namely, in the system according to the present invention, at least the third step (S3), the fourth step (S4) and the fifth step (S5) are performed by application software installed in the operation terminal and/or the server. In the third step (S3), the data having the control condition common with each other is extracted from the data stored in the server. In the fourth step (S4), the initial value of the parameter is determined based on the extracted data. In the fifth step (S5), the initial value of the parameter, which is determined in the fourth step (S4), is related with the common control condition and is stored in the server.

As specific examples of the storage device which the operation terminal and/or the server comprise, a hard disk drive (HDD), a solid state drive (SSD) and a memory (RAM or ROM), etc., can be mentioned, for example. As specific examples of the processing unit which the operation terminal and/or the server comprise, what is called a central processing unit (CPU), etc., can be mentioned, for example. The program for making a processing unit perform the second process may be stored in the storage device which either one of the operation terminal or the server comprise, alternatively may be stored dispersively in the storage devices which both the operation terminal and the server comprise. Moreover, each of the above-mentioned steps may be performed by a processing unit which either one of the operation terminal or the server comprise, alternatively may be performed by distributed processing with processing units which both the operation terminal and the server comprise.

In addition, as mentioned above, when an operator adjusts a parameter of a mass flow controller manually at the first step in the first process included in the method according to the present invention, adjusted data can be stored in the server by the operator inputting the adjusted parameter using an input device which the server itself comprises in the subsequent second step. Alternatively, adjusted data can be stored in the server by the operator inputting the adjusted parameter using an input device which the operation terminal comprises and transmitting the data to the server through the means of communication. However, from a viewpoint of increasing efficiency, it is preferable to accumulate the adjusted parameter automatically in the server by application software (namely, by a processing unit executing a predetermined instruction according to a program).

Then, in a preferred embodiment, the system according to the present invention is configured so as to perform the second step by the processing unit executing a predetermined instruction according to the program when accuracy of the flow control by the mass flow controller has reached a predetermined target value as a result of performing the first step. Namely, in this system, a process in which the second step to store the data in which the adjusted parameter and the control condition are related with each other in the server individually for a plurality of mass flow controllers to accumulate the data in the server is performed by the application software installed in the operation terminal and/or the server.

In addition, an operator may judge whether the accuracy of the flow control by the mass flow controller has reached the predetermined target value or not, and the above-mentioned application software may be made to start execution of the second step by an operator performing some operation (for example, input of a predetermined command or a click of an object, such as a button, which a user interface comprises, etc.). Alternatively, it is desirable that the judgment about whether the accuracy of the flow control by the mass flow controller has reached the predetermined target value or not is also performed automatically by application software (namely, by a processing unit executing a predetermined instruction according to a program).

In the latter case, specifically, the application software needs to judge whether a difference between a flow rate corresponding to an output signal regarding a flow rate of a fluid, which a flow sensor built in the mass flow controller outputs, and an actual flow rate is not more than a target value and whether an index of a chronological change of a flow rate when a set flow rate given to a mass flow controller is changed (transient response) is within a predetermined range or not. Therefore, in this case, it is necessary for the system according to the present invention to comprise a means to receive a signal required for detecting the difference between the flow rate corresponding to the output signal from the flow sensor built in the mass flow controller and an actual flow rate (namely, a flow rate corresponding to an output signal from a reference flow meter) as well as an index of a chronological change of a flow rate when a setting flow given to the mass flow controller is changed (transient response), and it is necessary for the above-mentioned program to comprise an instruction for performing algorithm required for making the above-mentioned judgment.

Moreover, from a viewpoint of further increasing efficiency, it is desirable that the first step included in the method according to the present invention is performed automatically by application software (namely, by a processing unit executing a predetermined instruction according to a program).

Then, in a preferred embodiment, the system according to the present invention is configured so as to increase or decrease the parameter by a predetermined quantity by the processing unit executing a predetermined instruction according to the program in the first step. Namely, in accordance with this system, in the first step, under a certain control condition, the parameter of the mass flow controller is adjusted automatically by application software (namely, by a processing unit executing a predetermined instruction according to a program).

In addition, the extent in which the parameter is increased or decreased in the first step by this system (namely, magnitude of increment or decrement) may be a fixed value predetermined for each parameter, or may be a value which is increased or decreased according to an extent of deviation from a target value of accuracy of flow control. In the latter case, the program may be configured such that the larger the extent of deviation from the target value of accuracy of the flow control is, the larger the increment or decrement of the parameter is.

Fourth Embodiment

In a fourth embodiment, the present invention is an invention of a system which adjusts a mass flow controller used under a certain control condition. In this system, the parameter of the mass flow controller is adjusted using the initial value of the parameter determined by the method according to the first embodiment. As mentioned above, unlike the default value used in the conventional technology, the initial value determined by the method according to the first embodiment is the value in which the result of the adjustment of the parameter performed in the past under the control condition under which the parameter is to be adjusted has been reflected. For this reason, time until accuracy of a control operation reaches a target value from a start of the adjustment is shortened, and the adjustment of a parameter can be completed quickly.

Namely, the system according to the fourth embodiment is configured so as to perform at least the sixth step and the seventh step included in the method according to the second embodiment of the present invention by the processing unit executing a predetermined instruction according to the program. Namely, in this system, in the above-mentioned third process, the sixth step and the seventh step are performed automatically by application software (namely, by a processing unit executing a predetermined instruction according to a program). In the sixth step, the initial value of the parameter related with the control condition at that time is read out from the server among the various initial values of the parameters determined by performing the above-mentioned first and second steps. In the seventh step, the initial value of the parameter read out in this way is input into the mass flow controller.

In addition, from a viewpoint of increase in efficiency, it is desirable that the eighth step included in the method according to the present invention is performed automatically by application software (namely, by a processing unit executing a predetermined instruction according to a program). Then, in a preferred embodiment, the system according to the present invention is configured so as to increase or decrease the parameter by a predetermined quantity by the processing unit executing a predetermined instruction according to the program in the eighth step.

In addition, the extent in which the parameter is increased or decreased in the eighth step by this system (namely, magnitude of increment or decrement) may be a fixed value predetermined for each parameter, or may be a value which is increased or decreased according to an extent of deviation from a target value of accuracy of flow control. In the latter case, the program may be configured such that the larger the extent of deviation from the target value of accuracy of the flow control is, the larger the increment or decrement of the parameter is.

In a preferred embodiment, the system according to the fourth embodiment is configured so as to perform the fourth process included in the method according to the above-mentioned preferable second embodiment by the processing unit executing a predetermined instruction according to the program. Namely, in this system, in the above-mentioned fourth process, the ninth step, the tenth step and the eleventh step are performed automatically by application software (namely, by a processing unit executing a predetermined instruction according to a program). In the ninth step, additional data in which the parameter of the mass flow controller adjusted in the eighth step is related with the control condition is stored in the server. In the tenth step, the data and the additional data having the control condition common with each other are extracted from the data and the additional data stored in the server. In the eleventh step, an initial value of the parameter is re-determined based on the data and the additional data extracted in the tenth step and the initial value stored in the server is updated to the initial value, which is thus re-determined. Therefore, in accordance with this system, the initial value of the parameter can be updated more efficiently by performing the fourth process automatically.

In a preferred embodiment, the system according to the fourth embodiment is configured so as to perform the twelfth step included in the method according to the above-mentioned preferable second embodiment by the processing unit executing a predetermined instruction according to the program. Namely, this system is configured so as to raise an alarm when a difference between the initial value read out from the server and input into the mass flow controller and the parameter adjusted based on the control condition and the input initial value exceeds a predetermined threshold value.

In accordance with this system, when the difference between the initial value of the parameter input into the mass flow controller before the adjustment and the parameter after the adjustment exceeds a threshold value, it is possible inform an operator of an occurrence of an abnormality by raising an alarm to prevent a wrongly adjusted mass flow controller from being supplied to a user in advance.

The invention claimed is:

1. A method for determining an initial value of a parameter regarding flow control, which is primarily input into a mass flow controller when adjusting said mass flow controller, which includes:

a first process to accumulate data in a server by performing a first step and a second step individually for a plurality of mass flow controllers, and in said first step, said parameter of the mass flow controller is adjusted under a certain control condition, and in said second step, said data in which said parameter adjusted in said first step and said control condition are related with each other is stored in said server, a second process to perform a third step, a fourth step and a fifth step, in said third step, said data having said control condition common with each other is extracted from said data stored in said server, in said fourth step, said initial value of said parameter corresponding to said control condition common with each other is determined based on said extracted data, and in said fifth step, said initial value of said parameter, which is determined in said fourth step, is related with said common control condition and is stored in said server;

adjusting the mass flow controller used under a certain control condition, the adjusting comprising performing a third process that includes a sixth step, a seventh step and an eighth step, in said sixth step, said initial value of said parameter related with said control condition is read out from said server among said initial values of said parameters, in said seventh step, said initial value of said parameter read out in said sixth step is input into said mass flow controller, and in said eighth step, said parameter of said mass flow controller is adjusted under said control condition.

2. The method according to claim 1, wherein:

said control condition includes a type of said mass flow controller, a kind of a fluid, and a bin size.

3. The method according to claim 1, wherein:

said adjustment of said mass flow controller includes an adjustment of a flow sensor, said initial value of said determined parameter includes initial values of parameters regarding a zero point, span and linearity.

4. The method according to claim 1, wherein:

said adjustment of said mass flow controller includes an adjustment of a transient response, and said initial value of said determined parameter includes initial values of parameters regarding a proportional gain, an integral gain and a derivative gain.

5. The method according to claim 1, wherein:

in said first step, said parameter which is primarily input into said mass flow controller when adjusting said mass flow controller is not an optimal value for said control condition, but is a provisional and generic default value with which said mass flow controller can be operated under a broad control condition.

6. The method according to claim 1, which further includes a fourth process performing a ninth step, a tenth step and an eleventh step, in said ninth step, additional data in which said parameter of said mass flow controller adjusted in said eighth step is related with said control condition is stored in said server, in said tenth step, said data and said additional data having said control condition common with each other are extracted from said data and said additional data stored in said server, and in said eleventh step, an initial value of said parameter is re-determined based on said data and said additional data extracted in said tenth step and said initial value stored in said server is updated to said initial value, which is thus re-determined.

7. The method according to claim 1, further including:

a twelfth step in which an alarm is raised when a difference between said initial value input into said mass flow controller in said seventh step and said parameter adjusted in said eighth step exceeds a predetermined threshold value.

8. A system used to determine an initial value of a parameter regarding flow control, which is primarily input into a mass flow controller when adjusting said mass flow controller, wherein:

said system comprises at least one operation terminal which is connected to said mass flow controller and is configured so as to be able to adjust said parameter, at least one server, and a means of communication which enables transfer of data among said mass flow controller and said operation terminal and said server, and a processing unit which said operation terminal and/or said server comprise, the processing unit configured to execute predetermined instructions according to a program stored in a storage device which said operation terminal and/or said server comprise, the instructions comprising instructions for:

a first process to accumulate data in a server by performing a first step and a second step individually for a plurality of mass flow controllers, and in said first step, said parameter of a mass flow controller is adjusted under a certain control condition, and in said second step, said data in which said parameter adjusted in said first step and said control condition are related with each other is stored in said server, a second process to perform a third step, a fourth step and a fifth step, in said third step, said data having said control condition common with each other is extracted from said data stored in said server, in said fourth step, said initial value of said parameter corresponding to said control condition common with each other is determined based on said extracted data, and in said fifth step, said initial value of said parameter, which is determined in said fourth step, is related with said common control condition and is stored in said server;

wherein said system is configured so as to perform, by said processing unit configured to execute predetermined instructions comprising instructions for a sixth step, a seventh step, and an eighth step wherein in said sixth step, said initial value of said parameter related with said control condition is read out from said server among said initial values of said parameters, in said seventh step, said initial value of said parameter read out in said sixth step is input into said mass flow controller, and in said eighth step, said parameter of said mass flow controller is adjusted under said control condition.

9. The system according to claim 8, wherein:

said system is configured so as to perform said second step by said processing unit executing a predetermined instruction according to said program when accuracy of said flow control by said mass flow controller has reached a predetermined target value as a result of performing said first step.

10. The system according to claim 8, wherein:

said system is configured so as to increase or decrease said parameter by a predetermined quantity by said processing unit executing a predetermined instruction according to said program in said first step.

11. The system according to claim 8, wherein:

said system is configured so as to increase or decrease said parameter by a predetermined quantity by said processing unit executing a predetermined instruction according to said program in said eighth step.

12. The system according to claim 8, wherein:

said system is configured so as to perform said fourth process by said processing unit executing predetermined instructions comprising instructions for:

performing a ninth step, a tenth step and an eleventh step, in said ninth step, additional data in which said parameter of said mass flow controller adjusted in said eighth step is related with said control condition is stored in said server, in said tenth step, said data and said additional data having said control condition common with each other are extracted from said data and said additional data stored in said server, and in said eleventh step, an initial value of said parameter is re-determined based on said data and said additional data extracted in said tenth step and said initial value stored in said server is updated to said initial value, which is thus re-determined.

13. The system according to claim 12, wherein:

said system is configured so as to perform, by said processing unit executing a twelfth step in which an alarm is raised when a difference between said initial value input into said mass flow controller in said seventh step and said parameter adjusted in said eighth step exceeds a predetermined threshold value.

* * * * *